US012681891B1

(12) United States Patent
K B et al.

(10) Patent No.: US 12,681,891 B1
(45) Date of Patent: Jul. 14, 2026

(54) ENUMERATION PROCESS FOR DETERMINING A COMMUNICATION PROTOCOL SUPPORTED BY A HOST DEVICE

(71) Applicant: Sandisk Technologies, Inc., Milpitas, CA (US)

(72) Inventors: Nihilesh K B, Coimbatore (IN); Prithviraj Sengupta, Bengaluru (IN); Ankit Rajani, Raipur (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/065,320

(22) Filed: Feb. 27, 2025

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ............................ G06F 13/4282; G06F 13/42
See application file for complete search history.

(56) References Cited

U.S. PATENT DOCUMENTS

| | | | | |
|---|---|---|---|---|
| 7,683,932 B2 * | 3/2010 | Ono | ...................... | G06F 3/0607 |
| | | | | 348/207.99 |
| 9,747,237 B2 * | 8/2017 | Paramasivam | ..... | G06F 13/4022 |
| 12,430,269 B2 * | 9/2025 | Pathirakani | ......... | G06F 13/4282 |
| 2012/0159008 A1 * | 6/2012 | Park | ...................... | G06F 13/387 |
| | | | | 710/15 |
| 2013/0163474 A1 * | 6/2013 | Chandra | ............. | H04L 12/4625 |
| | | | | 370/254 |
| 2013/0346650 A1 * | 12/2013 | Uehara | ................. | G06F 13/385 |
| | | | | 710/63 |
| 2014/0063943 A1 * | 3/2014 | Nagashima | ............ | G11C 16/12 |
| | | | | 365/185.23 |
| 2014/0365690 A1 * | 12/2014 | Paramasivam | ..... | G06F 11/2247 |
| | | | | 710/8 |
| 2017/0017496 A1 * | 1/2017 | Bajpai | ................. | G06F 11/3055 |
| 2018/0032471 A1 * | 2/2018 | Olarig | ................. | G06F 13/4282 |
| 2024/0427725 A1 * | 12/2024 | Nie | ....................... | G06F 13/105 |

* cited by examiner

*Primary Examiner* — Henry Tsai
*Assistant Examiner* — Christopher A Daley
(74) *Attorney, Agent, or Firm* — DENTONS Durham Jones Pinegar

(57) ABSTRACT

An accessory device includes a protocol analysis system that executes an enumeration process to identify whether a host device, to which the accessory device is connected, supports a first communication protocol or a second communication protocol. If the protocol analysis system initially determines the host device supports the first communication protocol, additional operations are executed to help ensure the accuracy of the determination. The accuracy of the determination is based on commands that are received from the host device. If the received commands indicate the determination is inaccurate, the protocol analysis system restarts the enumeration process using descriptors associated with the second communication protocol.

20 Claims, 7 Drawing Sheets

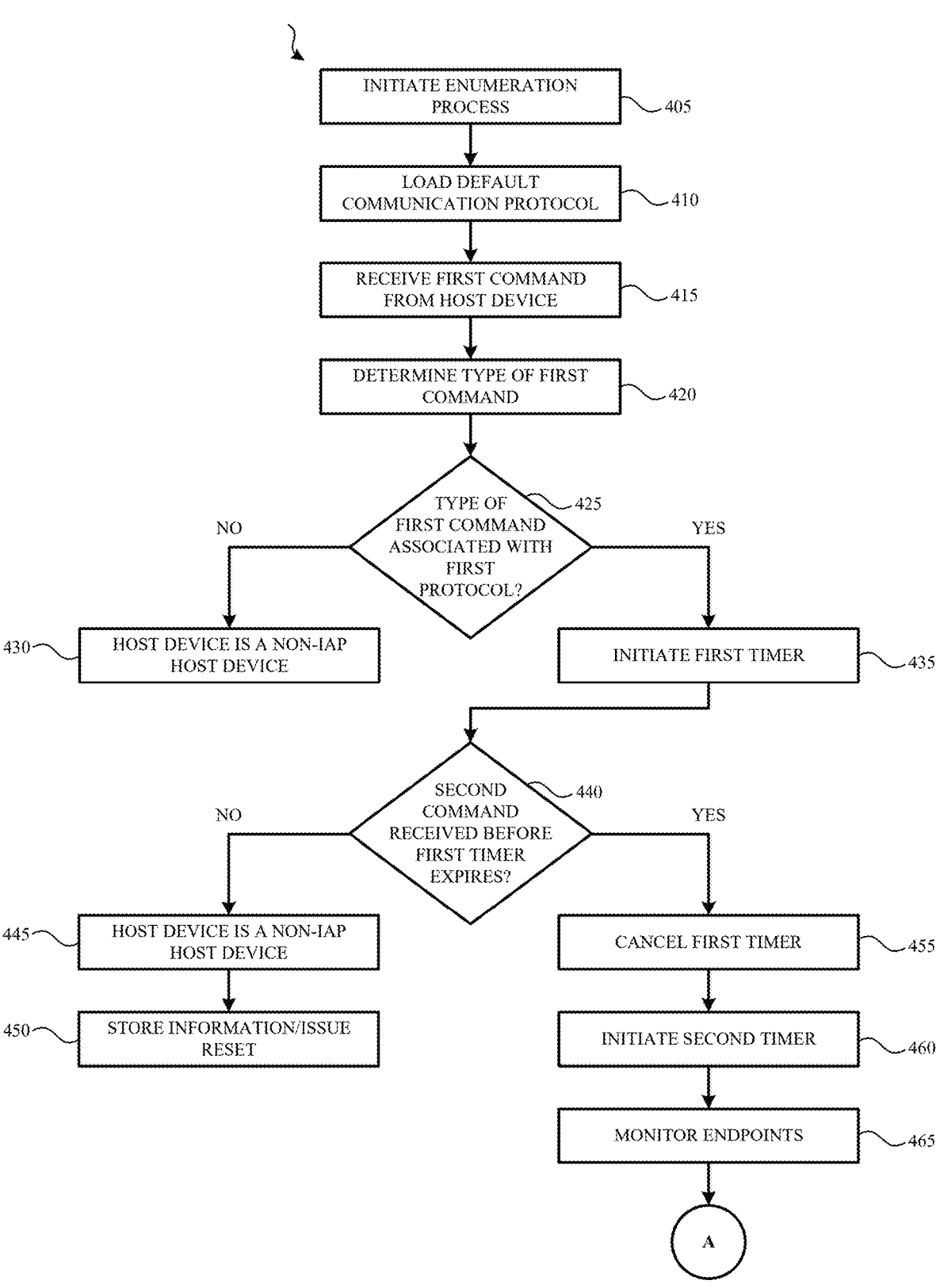

INITIATE ENUMERATION PROCESS ~405

LOAD DEFAULT COMMUNICATION PROTOCOL ~410

RECEIVE FIRST COMMAND FROM HOST DEVICE ~415

DETERMINE TYPE OF FIRST COMMAND ~420

TYPE OF FIRST COMMAND ASSOCIATED WITH FIRST PROTOCOL? ~425

NO → HOST DEVICE IS A NON-IAP HOST DEVICE ~430

YES → INITIATE FIRST TIMER ~435

SECOND COMMAND RECEIVED BEFORE FIRST TIMER EXPIRES? ~440

NO → HOST DEVICE IS A NON-IAP HOST DEVICE ~445 → STORE INFORMATION/ISSUE RESET ~450

YES → CANCEL FIRST TIMER ~455 → INITIATE SECOND TIMER ~460 → MONITOR ENDPOINTS ~465

ENUMERATION PROCESS FOR DETERMINING A COMMUNICATION PROTOCOL SUPPORTED BY A HOST DEVICE

BACKGROUND

When an accessory device, such as a data storage device, is physically connected to a host device (e.g., via a Universal Serial Bus (USB) connector), an enumeration process is initiated. The enumeration process enables the host device to identify information about the accessory device, which enables the host device to communicate with the accessory device.

For example, when the accessory device is physically connected to the host device, the host detects the presence of the accessory device and receives information about the accessory device in terms of USB configuration descriptors. The USB configuration descriptors include device descriptors, configuration descriptors, Binary device Object Store (BOS) descriptors and the like. The USB descriptors provide information regarding the interfaces supported by the accessory device. These interfaces include mass storage class (MSC) interfaces such as a USB attached Small Computer System Interface (SCSI) (UAS) interface descriptor and/or a Bulk only Transfer (BoT) interface descriptor). The interfaces also indicate how the host device is to communicate with the accessory device and the capabilities of the accessory device. This information enables the host device to properly configure and use the accessory device.

However, various host devices use different communication protocols to communicate with the connected accessory device. For example, some host devices use the MSC interfaces (e.g., UAS or BoT) to communicate with the accessory device while other host devices use the iPad Accessory Protocol (IAP) interface to communicate with the accessory device.

In order to ensure that all host devices (e.g., IAP host devices and non-IAP host devices) can properly communicate with a connected accessory device, the accessory device may advertise its own native protocol. However, designing a system in which the MSC interfaces are advertised along with the IAP interface in the USB configuration descriptor leads to enumeration issues. For example, the IAP interface will not be detected by an IAP host device.

Accordingly, it would be beneficial to advertise the IAP interface to IAP host devices and advertise non-IAP interfaces, such as the MSC interfaces, to non-IAP host devices.

SUMMARY

The present disclosure describes a protocol analysis system for an accessory device. The protocol analysis system supports and executes an enumeration process that identifies whether the host device to which the accessory device is connected supports a first communication protocol (e.g., the IAP) or a second communication protocol (e.g., a mass storage class (MSC) interface such as a USB attached Small Computer System Interface (SCSI) (UAS) interface descriptor and/or a Bulk only Transfer (BoT) interface descriptor). For example, and as will be described in greater detail herein, when the accessory device is connected to the host device, the protocol analysis system advertises a descriptor associated with the first communication protocol.

However, during the course of the enumeration process, and based on various commands that are received from the host device, the protocol analysis system determines whether to keep advertising, and ultimately use, the first communication protocol or whether an internal reset, which triggers a reset from the host device, should be issued. The reset will restart the enumeration process and the protocol analysis system will advertise a descriptor associated with the second communication protocol.

In some examples, if the first communication protocol is ultimately selected and used, the protocol analysis system will also determine whether the accessory device and the host device can communicate with each other using the first communication protocol. For example, the protocol analysis system will determine whether the host device has an application (or other software) installed that enables the host device to access and communicate with the accessory device. If the protocol analysis system determines that the host device does not have the application installed, the protocol analysis system issues a reset which causes the accessory device to advertise, and subsequently use, the second communication protocol.

Accordingly, examples of the present disclosure describe a method that includes initiating an enumeration process in response to detecting a power on event. The accessory device receives a command from a host device and determines a type of the received command. Based, at least in part, on determining the command received from the host device is a first type of command, the accessory device determines the first communication protocol is unsupported by the host device and advertises a second communication protocol to the host device. However, if the accessory device determines that the command received from the host device is a second type of command, a timer is initiated and a determination is made as to whether a third type of command is received before expiration of the timer. However, if the timer expires, the accessory device determines that the first communication protocol is unsupported by the host device and advertises the second communication protocol to the host device.

Other examples describe an accessory device that includes a controller and a protocol analysis system associated with the controller. The protocol analysis system is operable to determine whether a host device to which the accessory device is connected supports an iPod Accessory Protocol (IAP). In an example, the determination is made by the following operations executed by the protocol analysis system. For example, when a command is received from the host device, the protocol analysis system determines whether the received command is a first type of command or a second type of command. Based, at least in part, on determining the received command is the first type of command, the protocol analysis system determines the IAP is unsupported by the host device and advertises another interface associated with the Universal Serial Bus (USB) protocol to the host device. Based, at least in part, on determining the received command is the second type of command, the protocol analysis system initiates a timer and determines whether a third type of command is received before expiration of the timer. If the timer expires, the protocol analysis system determines the IAP is unsupported by the host device and advertises the another interface associated with the USB protocol to the host device.

Still other examples describe an accessory device having means for advertising an iPod Accessory Protocol (IAP) protocol to a host device to which the accessory device is connected. The accessory device also includes means for receiving a command from the host device and means for determining whether the command received from the host device is a first type of command or a second type of command. Based, at least in part, on the means for determining whether the command received from the host device is the first type of command or the second type of command determines that the command received from the host device is the first type of command, a means for determining the IAP is unsupported by the host device determines that the IAP is unsupported by the host device and a means for advertising another interface associated with a Universal Serial Bus (USB) protocol to the host device advertises the another interface associated with the USB protocol to the host device. However, based, at least in part, on the means for determining whether the command received from the host device is the first type of command or the second type of command determines that the command received from the host device is the second type of command, a means for initiating a timer initiates the timer and a means for determining whether a third type of command is received before expiration of the timer determines whether the third type of command is received before expiration of the timer. Based, at least in part, on the means for determining whether the third type of command is received before expiration of the timer determines the timer has expired, the means for determining the IAP is unsupported by the host device determines that the IAP is unsupported by the host device and the means for advertising the another interface associated with the USB protocol to the host device advertises the another interface associated with the USB protocol to the host device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 4A-FIG. 4B illustrates a method for determining whether a host device is an IAP host device or a non-IAP host device according to an example.

DETAILED DESCRIPTION

Figure 1:
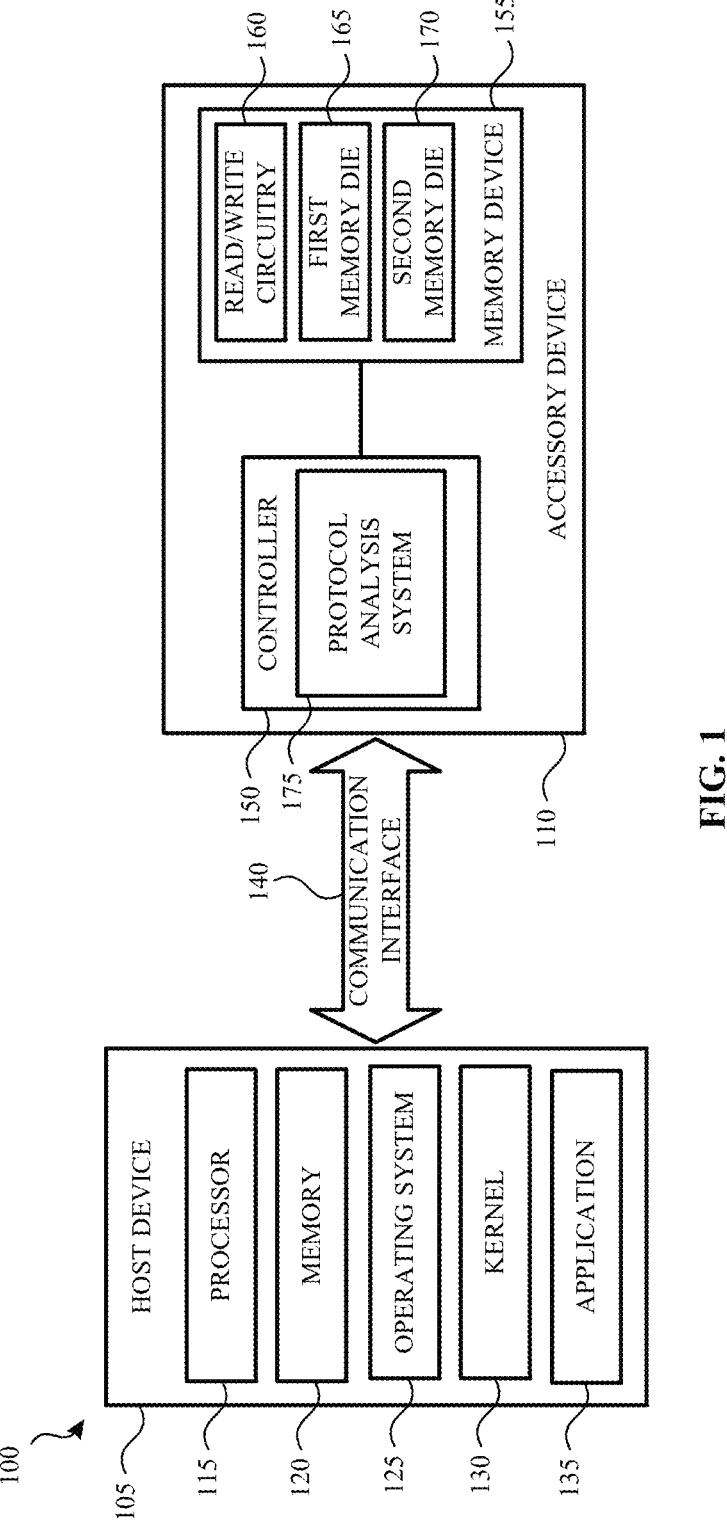
FIG. 1 is a block diagram of a system that includes a host device and an accessory device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Host devices (e.g., host computing devices) may be classified based, at least in part, on a communication protocol that is used to communicate with an accessory device that is physically connected to the host device. For example, when the accessory device is connected to the host device via a Universal Serial Bus (USB) connector or port, the host device communicates with the accessory device using either an iPod Accessory Protocol (IAP) or an interface associated with the USB communication protocol, such as, for example, the UAS interface and/or the BoT interface. As such, a host device may be viewed as an IAP host device or a non-IAP host device.

When the accessory device is connected to the host device, an enumeration process is initiated. As previously explained, the enumeration process enables the host device to identify information about the connected accessory device. This enables the host device to communicate with the accessory device.

For example, when the accessory device is connected to the host device, the accessory device provides descriptors to the host device. If the host device is a non-IAP host device, the descriptors (also referred to as interface descriptors) provided by the accessory device to the host device are the MSC descriptors previously described (e.g., the UAS interface descriptor and/or the BoT interface descriptor). However, if the host device is an IAP host device, the descriptor provided by the accessory device to the host device is an IAP interface descriptor.

An accessory device may advertise both the IAP and the USB communication protocol, and their associated descriptors, to the host device. However, due to the way the accessory device is connected to the host device, the host device may only recognize the UAS interface descriptor and/or the BoT interface descriptor. For example, the host device may only recognize these descriptors because the accessory device is connected to the host device via a USB port on the host device. However, this may lead to enumeration issues for IAP host devices.

To address the above, the present disclosure describes a protocol analysis system for an accessory device. The protocol analysis system supports and executes an enumeration process that identifies whether the host device to which the accessory device is connected supports a first communication protocol and its associated interface, such as the IAP, or the second communication protocol, and its associated interfaces, such as the MSC interfaces associated with the USB communication protocol. In the examples that follow, if the host device supports the first communication protocol, it is referred to as an IAP host device. However, if the host device does not support the first communication protocol, or supports other interfaces that are associated with the USB communication protocol, such as, for example, the MSC interfaces, the host device is referred to as a non-IAP host device. Although the MSC interfaces are used in the examples that follow, other interfaces associated with the USB communication protocol may be used.

As will be described in greater detail herein, when the enumeration process begins, such as when the accessory device is connected to the host device, the accessory device advertises interface descriptors (e.g., the IAP interface descriptor) associated with the first communication protocol by default. In the examples that follow, when the accessory device is advertising interface descriptors associated with the first communication protocol, or the IAP interface descriptors, the accessory device is operating in a first communication protocol mode. During the course of the enumeration process, and based on various commands that are received from the host device, the protocol analysis system determines whether to keep advertising and ultimately use the first communication protocol or whether a reset should be issued.

The reset restarts the enumeration process and the protocol analysis system will advertise descriptors or interfaces associated with a different communication protocol. For example, the protocol analysis system will advertise or provide the interface descriptors associated with a second communication protocol. These descriptors may include the UAS interface descriptors and/or the BoT interface descriptors that are associated with the USB communication protocol. In the examples that follow, when the accessory device is advertising interface descriptors associated with the second communication protocol, or the UAS interface descriptors and/or the BoT interface descriptors, the accessory device is operating in a second communication protocol mode.

If the protocol analysis system ultimately determines that the host device is an IAP host device, the protocol analysis system will also determine whether the accessory device and the IAP host device can communicate with each other using the first communication protocol. For example, the protocol analysis system will determine whether the host device has an application (or other software) installed that enables the host device to access the accessory device. If the protocol analysis system determines that the host device does not have the application installed, the protocol analysis system issues a reset which causes the accessory device to advertise, and subsequently use, the second communication protocol or operate in the second communication protocol mode.

Accordingly, many technical benefits may be realized including, but not limited to, allowing an IAP enabled accessory device to seamlessly enumerate on all platforms and become authenticated on IAP host devices while also providing a user experience optimization of selecting a different communication protocol if the accessory device determines that particular software is not installed on the IAP host device.

These benefits, along with other examples, will be shown and described in greater detail with respect to FIG. 1-FIG. 5.

FIG. 1 is a block diagram of a system 100 that includes a host device 105 and an accessory device 110 according to an example. In an example, the accessory device 110 is a data storage device, such as, for example, a NAND data storage device. Although a data storage device is specifically mentioned, the accessory device 110 may be any type of accessory device that is communicatively and/or physically coupled (e.g., via a USB port) to the host device 105.

In an example, the host device 105 includes a processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the accessory 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof. In an example, the operating system 125 includes or is otherwise associated with a kernel 130. The kernel 130 includes instructions for managing various resources of the host device 105 such as, for example, providing various instructions, commands and/or information to the accessory device 110 as part of an enumeration process.

The communication interface 140 communicatively couples the host device 105 and the accessory device 110. In an example, the communication interface 140 is a USB communication interface. In an example, the accessory device is an external device or a portable device that can be communicatively or selectively coupled to, and removed from, the host device 105—although this is not required.

The accessory device 110 includes at least one controller 150 or other processing circuitry. In examples in which the accessory device 110 is a data storage device, the accessory device 110 also includes a memory device 155. Although a data storage device is specifically mentioned, the accessory device 110 may be any type of accessory device that can be connected to the host device 105.

In an example, and when the accessory device 110 is a data storage device, the controller 150 is communicatively coupled to the memory device 155. The memory device 155 includes one or more memory dies (e.g., a first memory die 165 and a second memory die 170). Although two memory dies are shown, the memory device 155 may include any number of memory dies (e.g., one memory die, two memory dies, eight memory dies, or another number of memory dies). Additionally, and although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. In one example, the memory cells are arranged in a two-dimensional configuration. In another example, the memory cells are arranged in a three-dimensional configuration.

The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

As previously described, the accessory device 110 includes at least one controller 150. Although a single controller 150 is shown and described, the accessory device 110 can include multiple controllers and/or processing circuitry. In such an example, a first controller executes a first operation, or a set of operations, and the second controller executes a second operation, or a second set of operations. In an example, the first set of operations and the second set of operations are executed in parallel. In other examples, the different sets of operations are executed in sequence.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to, and/or receive data from, the memory device 155.

The controller 150 also includes, or is otherwise associated with, a protocol analysis system 175. In an example, the protocol analysis system 175 is a packaged functional hardware unit designed for use with other components/systems. In another example, the protocol analysis system 175 is a portion of a program code (e.g., software or firmware) executable by, the controller 150, a processor or processing circuitry. In yet another example, the protocol analysis system 175 is a self-contained hardware and/or software component/system that interfaces with other components and/or systems. Although the protocol analysis system 175 is shown as being part of the controller 150, the protocol analysis system 175 may be separate from the controller 150.

In an example and as previously indicated, the accessory device 110 may be physically connected to, and disconnected from, the host device 105. For example, the accessory device 110 is physically connected to the host device 105 using a USB port on, or otherwise associated with, the host device 105. In some examples, when the accessory device 110 is connected to the host device 105, the accessory device 110 powers on and the protocol analysis system 175 latches on to an enumeration sequence to perform discovery operations.

The enumeration process includes a series of descriptor exchanges between the accessory device 110 and the host device 105. The descriptors contain information associated with the accessory device 110 such as, for example, a name of the accessory device 110, a model of the accessory device 110, communication protocols supported by the accessory device 110 and so on. The host device 105 is associated with a sequence that is followed as part of the enumeration process. This sequence will be described in greater detail herein and will cause the accessory device 110 to successfully determine whether the host device 105 supports the first communication protocol (e.g., the IAP or is an IAP host device) or whether the host device 105 supports the second communication protocol (e.g., the USB communication protocol or is a non-IAP host device).

Figure 2A:
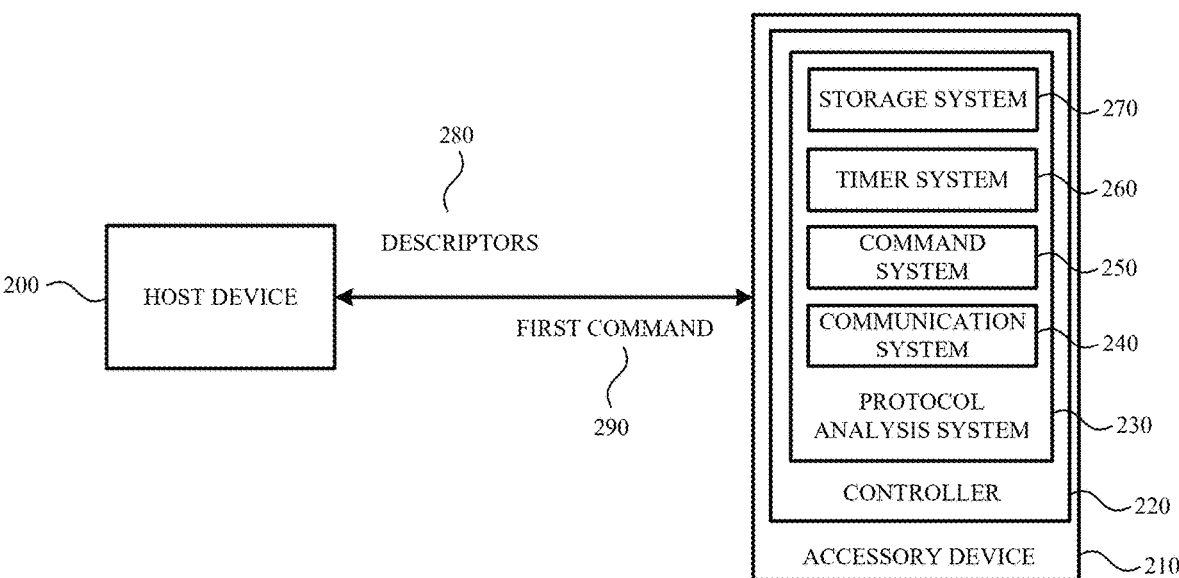
FIG. 2A is a block diagram that shows an accessory device being physically connected to a host device according to an example.

FIG. 2A is a block diagram of an accessory device 210 being physically connected to a host device 200 according to an example. In an example, the host device 200 is similar to the host device 105 shown and described with respect to FIG. 1. Likewise, the accessory device 210 is similar to the accessory device 110 shown and described with respect to FIG. 1.

In an example, the accessory device 210 includes a controller 220 or other processing circuitry. The accessory device 210 and/or the controller 220 is also associated with, or includes a protocol analysis system 230. The protocol analysis system 230 may be similar to the protocol analysis system 175 shown and described with respect to FIG. 1. As such, the protocol analysis system 230 is operable to determine whether the host device 200 supports a first communication protocol (e.g., whether the host device 200 is an IAP host device) or whether the host device 200 supports a second communication protocol (e.g., whether the host device 200 is a non-IAP host device).

In an example, the protocol analysis system 230 includes or is otherwise associated with a communication system 240, a command system 250, a timer system 260 and a storage system 270. Although each of these systems are shown as being part of the protocol analysis system 230, it is contemplated that some of the systems are part of, or otherwise associated with the controller 220 and/or the accessory device 210. Each of these systems will be described in greater detail herein.

In an example, the accessory device 210 is physically and/or communicatively coupled to the host device 200 using a cable (e.g., a USB cable) and a port (e.g., a USB port) on, or otherwise associated with, the host device 200. When the accessory device 210 is connected to the host device 200, the accessory device 210 is powered on.

In response to the accessory device 210 being powered on, the protocol analysis system 230 initiates an enumeration process. As part of the enumeration process, the protocol analysis loads a default configuration (e.g., the IAP) as the first communication protocol. The protocol analysis system also advertises and/or provides one or more descriptors 280 to the host device 200. In a specific example, the host device 200 issues a GET_CONFIG command to get the list of the interfaces supported by the accessory device 210.

In an example, the protocol analysis system 230 operates in a first communication protocol mode (e.g., an IAP mode), or supports the first communication protocol, by default. As such, the descriptors 280 are associated with the first communication protocol, such as, for example, the IAP.

In response to receiving the descriptors 280 and/or in response to the accessory device 210 being powered on, the host device 200 provides a first command 290 to the accessory device 210. In response to receiving the first command 290, the command system 250 of the protocol analysis system 230 determines whether the first command 290 is a first type of command or a second type of command. For example, the command system 250 of the protocol analysis system 230 determines whether the first command 290 is associated with the first communication protocol (e.g., the IAP) or whether the first command is associated with a second communication protocol (e.g., the interfaces associated with the USB communication protocol).

In a specific example, the command system 250 is operable to determine whether the first command 290 is a GET_DEVICE command or request associated with the MSC interfaces associated with the USB communication protocol or whether the first command 290 is a SET_AD-DRESS command or request associated with the IAP. If the command system 250 determines the first command 290 is a GET_DEVICE command (e.g., the GET_DEVICE command is received by the command system 250 before the SET_ADDRESS command is received by the command system 250), the protocol analysis system 230 determines that the host device 200 is a non-IAP host device or otherwise supports the second communication protocol.

In response to this determination, the protocol analysis system 230 modifies the one or more descriptors 280 (e.g., the GET_CONFIG command is modified) to include interface descriptors associated with the second communication protocol. For example, the protocol analysis system 230 modifies the descriptors 280 to include at least one of the MSC descriptors such as, for example, the UAS interface descriptor and/or the BoT interface descriptor.

In some examples, the identification of the type of first command 290 is enough to determine whether the host device 200 is an IAP host device or a non-IAP host device. However, there may be cases in which the protocol analysis system 230 is unable to make this determination at this point. As such, the protocol analysis system 230 is further operable to initiate a first timer and determine whether a specific command is received from the host device 200 before the first timer expires.

For example, if the protocol analysis system 230 is unable to determine whether the host device 200 supports the first communication protocol or the second communication protocol, the protocol analysis system 230 causes the timer system 260 to initiate a first timer. In an example, the first timer is a two (2) second timer. Although a 2 second timer is specifically mentioned, the first timer may have any value. For example, the timer may be shorter than 2 seconds or longer than 2 seconds.

When the first timer is initiated, the protocol analysis system 230 determines whether a second command is received prior to expiration of the first timer. For example and referring to FIG. 2B, FIG. 2B is a block diagram that illustrates various commands being transmitted between the accessory device 210 and the host device 200 of FIG. 2A according to an example.

Figure 2B:
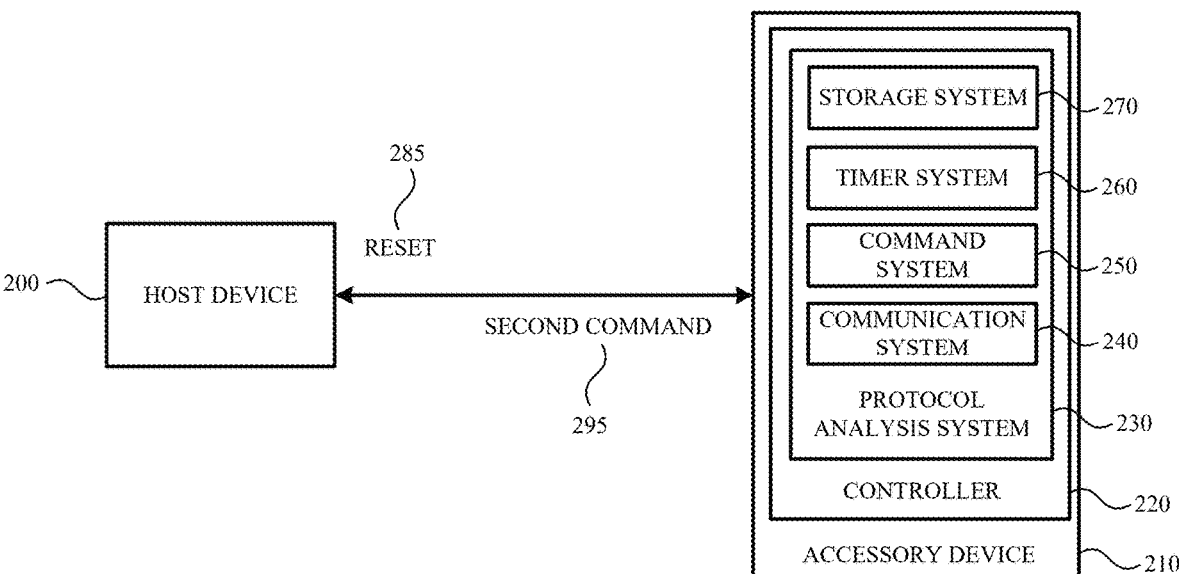
FIG. 2B is a block diagram that illustrates various commands being transmitted between the accessory device and the host device of FIG. 2A according to an example.

In the example shown in FIG. 2B, the command system 250 of the protocol analysis system 230 determines whether a second command 295 is received from the host device 200 prior to expiration of the first timer. In a specific example, the second command 295 is a SET_CONFIG command.

If the protocol analysis system 230 determines that the first timer has expired before the second command 295 is received, the protocol analysis system 230 determines that the host device 200 is a non-IAP host device (or supports the second communication protocol). In an example, and in response to this determination, the protocol analysis system 230 stores information in the storage system 270 that indicates the host device 200 is a non-IAP host device.

As such, when one or more subsequent descriptors (e.g., descriptors that are provided post an accessory initiated reset that triggers a USB reset) are provided to the host device 200 (e.g., via the communication system 240), interface descriptors associated with the second communication protocol are advertised to the host device 200. For example, the protocol analysis system 230 sets a variable or other indicator in the storage system 270 that indicates that the UAS interface descriptor and/or the BoT interface descriptor should be advertised on the next enumeration process and/or that the accessory device 210 should operate in the second communication protocol.

In an example, the storage system 270 is a volatile memory system. As such, the accessory device 210 and/or the protocol analysis system 230 will revert to its default configuration (e.g., advertising IAP) if power to the accessory device 210 is lost. As a result, the accessory device 210 will always come up in the default interface mode (e.g., the IAP mode) after every power cycle.

In response to the first timer expiring, the protocol analysis system 230 also issues or provisions a reset 285. The reset 285 will cause the accessory device 210 to be disconnected from the host device 200 and subsequently be reconnected to the host device 200. For example, the reset 285 performed by the accessory device 210 will scramble a link (e.g., a USB link) between the host device 200 and the accessory device 210 and force the host device 200 to send a USB reset. The USB reset causes the enumeration process to start over but will not cut power to the accessory device 210.

As a result, the reset 285 will not cause the accessory device to revert to its default state (e.g., the default state of operating in the first communication protocol mode). In an example, the protocol analysis system 230 checks the storage system 270 for the variable each time the reset 285 is issued. As such, the accessory device 210 will be in the detected mode (e.g., in the first communication protocol mode or the second communication protocol mode).

However, if the protocol analysis system 230 determines the second command 295 is received from the host device 200 prior to expiration of the first timer, the protocol analysis system 230 may still be unable to determine whether the host device 200 is an IAP host device or a non-IAP host device. As such, the protocol analysis system 230 is further operable to cancel the first timer and cause the timer system 260 to initiate a second timer.

In an example, the second timer has a value that is less than the first timer. For example, the second timer is a one point two (1.2) second timer. Although a 1.2 second timer is specifically mentioned, the second timer may be longer than 1.2 seconds or shorter than 1.2 seconds.

When the second timer has been set, the protocol analysis system 230 determines whether a communication is occurring via the first communication protocol. For example, the protocol analysis system 230 determines whether an endpoint corresponding to the first communication protocol is pinged.

If a ping on the endpoint occurs, the protocol analysis system 230 determines the host device 200 is an IAP host device. However, if the ping on the endpoint does not occur within the second timer, the protocol analysis system 230 determines the host device 200 is a non-IAP host device and a reset 285 is issued. When the reset 285 is issued, the reset operations previously described are executed and the host device 200 is identified as a non-IAP host device. As a result, upon completion of the reset, the accessory device operates in the second communication protocol mode.

In some examples, even if the host device 200 is identified as an IAP host device, there still may be some communication issues between the host device 200 and the accessory device 210. For example, if a particular application or software (e.g., a third party application or software) associated with the accessory device 210 has not been installed on the host device, the IAP authentication operations described above may be completed, but the accessory device 210 may not be exposed to the operating system (e.g., the operating system 125 (FIG. 1)) of the host device 200. In such an example, the protocol analysis system 230 will issue a reset 285 and operate in the second communication protocol mode. As such, the accessory device will be accessible via the second communication protocol.

Figure 3:
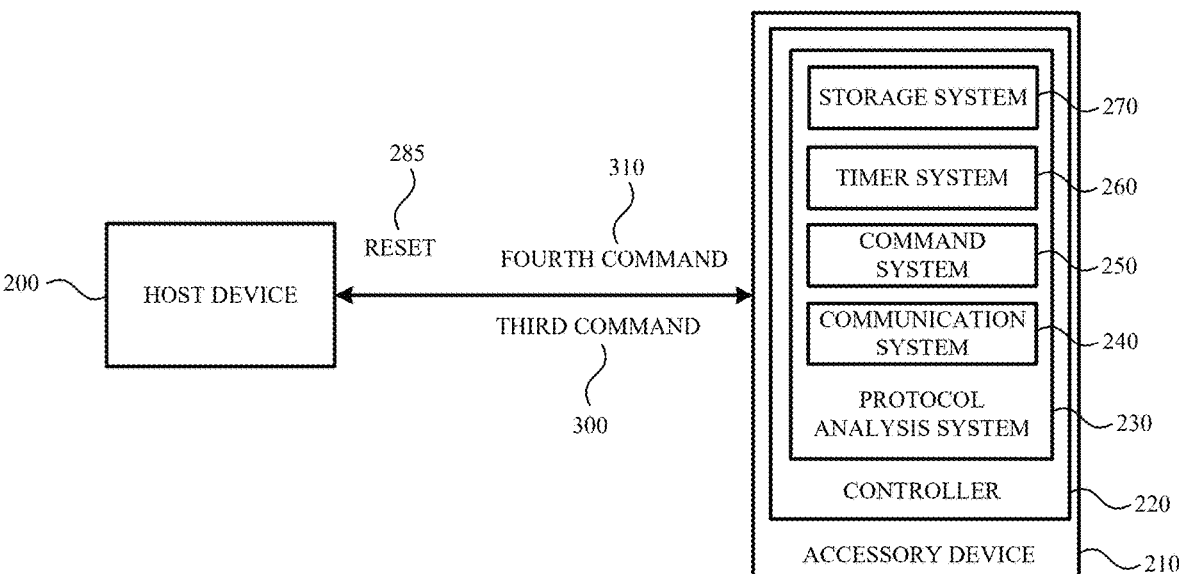
FIG. 3 is a block diagram that illustrates how the protocol analysis system determines whether software associated with the accessory device has been installed on the host device when the host device is identified as supporting a first communication protocol according to an example.

FIG. 3 is a block diagram that illustrates how the protocol analysis system 230 determines whether software associated with the accessory device 210 has been installed on the host device 200 when the host device 200 is identified as supporting the first communication protocol according to an example. For example, when the host device 200 is identified as an IAP host device, the command system 250 of the protocol analysis system 230 determines a whether a third command 300 that is received is associated with the first communication protocol or the second communication protocol.

If the command system 250 determines that the third command 300 is associated with the second communication protocol, the protocol analysis system 230 determines that the software associated with the accessory device 210 has been installed on the host device. For example, the command system 250 determines whether the third command 300 issued by the host device 200 is a SET_INTERFACE command for an external accessory (EA) interface associated with the IAP. If the command system 250 determines that the third command 300 is the SET_INTERFACE command for the EA interface, the accessory device 210 will operate in the first communication protocol mode (e.g., the IAP mode).

For example, if the command system 250 determines the third command 300 is a request (e.g., a Request App Launch command associated with the IAP) to launch an application or software associated with the accessory device 210, the protocol analysis system 230 causes the timer system 360 to initiate a third timer. In an example, the third timer has a value that is less than the second timer. For example, the third timer is a one (1) second timer. Although a 1 second timer is specifically mentioned, the third timer may be longer than 1 second or shorter than 1 second.

Before expiration of the third timer, if a fourth command 310 associated with the first communication protocol is received from the host device 200, the accessory device 210 will continue to operate in the first communication protocol mode (e.g., the IAP mode). For example, if the fourth command 310 is a SET_INTERFACE command for the EA interface, and this command is received before expiration of the third timer, the accessory device 210 will continue to operate using the first communication protocol. However, if the third timer expires, the protocol analysis system 230 will issue a reset 285 such as previously described. As a result, the accessory device 210 will operate in the second communication protocol mode (e.g., the second communication protocol mode).

Figure 4B:
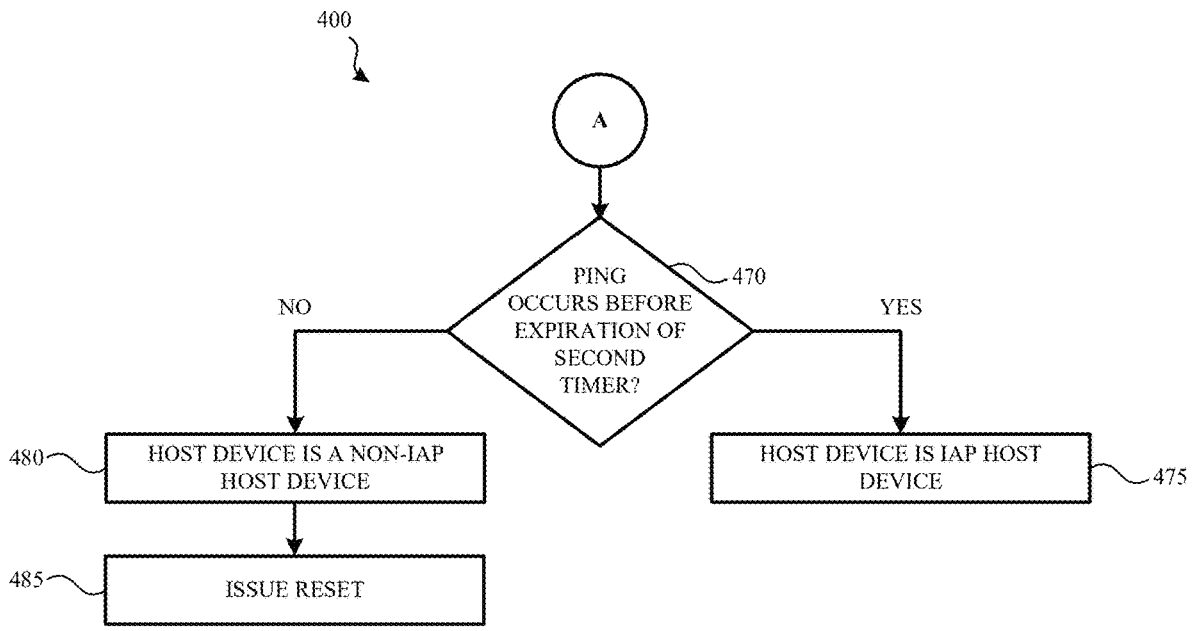

FIG. 4A-FIG. 4B illustrates a method 400 for determining whether a host device is an IAP host device or a non-IAP host device according to an example. In an example, the method 400 is executed by a protocol analysis system of an accessory device, such as, for example, the protocol analysis system 230 shown and described with respect to FIG. 2A-FIG. 2B. In an example, the method 400 begins when the accessory device is communicatively coupled to the host device. For example, the method 400 begins when the accessory device is physically connected to a USB port of the host device and/or when the accessory device is powered on.

When the accessory device is powered on, the protocol analysis system initiates (405) an enumeration process. As part of the enumeration process, the protocol analysis system loads (410) the default communication protocol (e.g., the IAP) as the first communication protocol.

In response to the advertisement of the one or more descriptors, a host device provides a first command to the accessory device. As a result, the first command is received (415) by the protocol analysis system.

In response to receiving the first command from the host device, the protocol analysis system determines (420) a type of the first command. For example, the protocol analysis system determines whether the first command is associated with a first communication protocol (e.g., the IAP) or whether the first command is associated with a second communication protocol (e.g., the USB communication protocol).

If the protocol analysis system determines (425) the first command is a type of command that is not associated with the first communication protocol, the protocol analysis system determines (430) the host device is a non-IAP host device. In an example, a reset is not issued because a GET_CONFIG command has not yet been issued by the host device. As a result, the accessory device will internally change the advertised interfaces to the interfaces associated with the second communication protocol prior to the GET_CONFIG command being issued. The accessory device then operates in a second communication protocol mode.

However, if the protocol analysis system determines (425) the first command is of a type that is associated with the first communication protocol, the protocol analysis system initiates (435) a first timer. The protocol analysis system then determines (440) whether a specific, second command is received from the host device before the first timer expires.

If the protocol analysis system determines (440) that the second command is not received before the first timer expires, the protocol analysis system determines (445) that the host device is a non-IAP host device. As such, the protocol analysis system stores information (450) that indicates the host device is a non-IAP host device and issues a reset such as previously described.

However, if the protocol analysis system determines (440) the second command is received from the host device prior to expiration of the first timer, the protocol analysis system cancels (455) the first timer and initiates (460) a second timer.

In response to the second timer being initiated, the protocol analysis system monitors (465) one or more endpoints of the accessory device to determine whether a communication is occurring via the first communication protocol. For example, the protocol analysis system determines whether an endpoint corresponding to the first communication protocol is pinged.

If the protocol analysis system determines (470) a ping on the endpoint of the accessory device occurs, the protocol analysis system determines (475) the host device is an IAP host device. However, if the protocol analysis system determines (470) that a ping on the endpoint of the accessory device does not occur within the second timer, the protocol analysis system determines (480) the host device is a non-IAP host device. The protocol analysis system also issues (485) a reset such as previously described.

Figure 5:
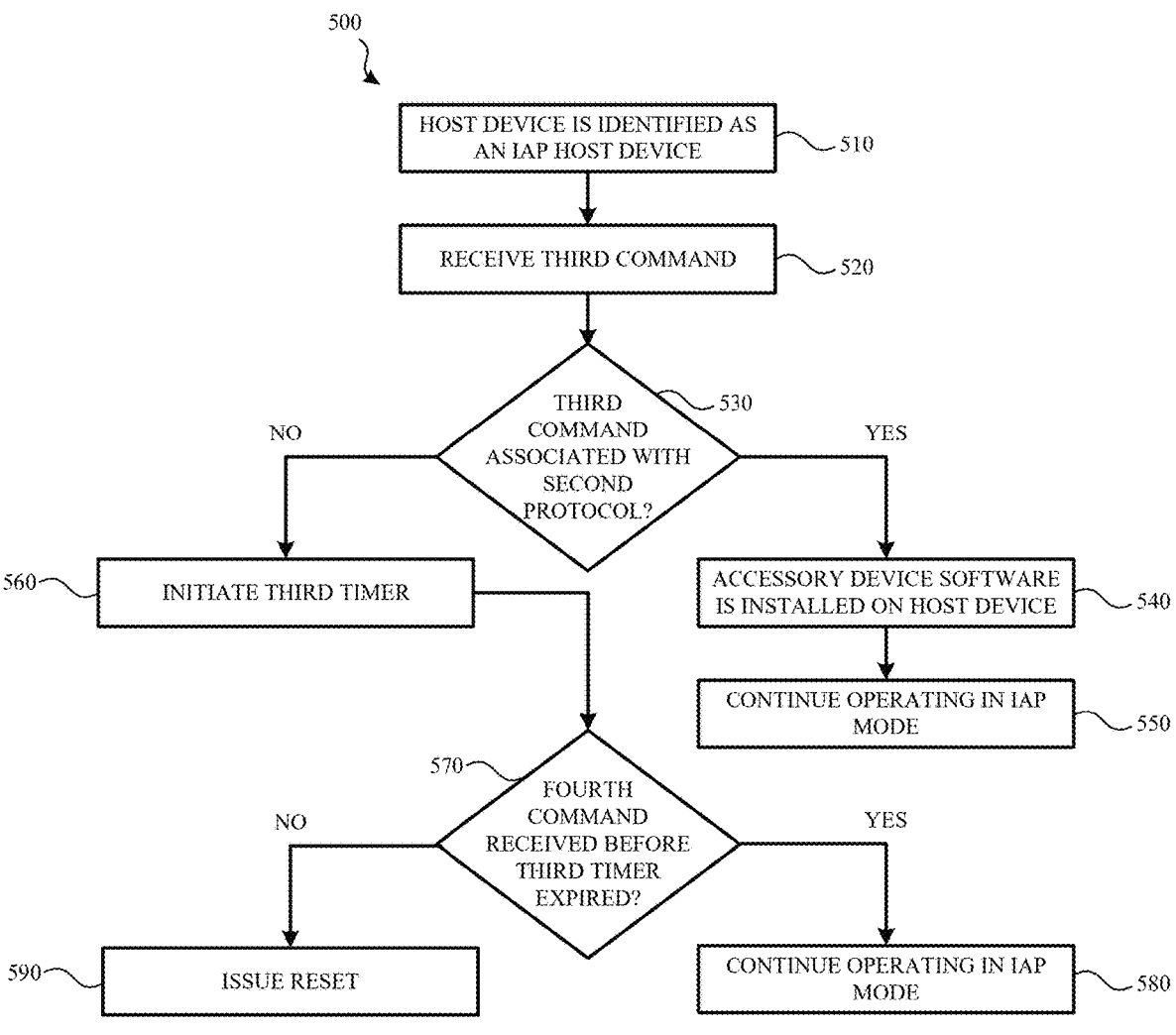
FIG. 5 illustrates a method for determining whether a host device, that is identified as an IAP host device, has installed software that is associated with an accessory device according to an example.

FIG. 5 illustrates a method 500 for determining whether a host device, that is identified as an IAP host device, has installed software that is associated with an accessory device according to an example. In an example, the method 500 is executed by a protocol analysis system of an accessory device, such as, for example, the protocol analysis system 230 shown and described with respect to FIG. 2A-FIG. 3. In an example, the method 500 begins after the method 400 shown and described with respect to FIG. 4A-FIG. 4B has completed.

For example, the method 500 begins when a host device is identified (510) as an IAP host device such as previously described. When the host device is identified as an IAP host device, the accessory device receives (520) a third command.

In response to receiving the third command, the protocol analysis system determines (530) whether the third command is associated with the second communication protocol. If so, the protocol analysis system determines (540) that the software associated with the accessory device has been installed on the host device. As a result, the accessory device continues operating (550) in the IAP mode.

For example, and as previously explained, the protocol analysis system determines whether the third command issued by the host device is a SET_INTERFACE command for an EA interface associated with the IAP. If the protocol analysis system determines that the third command is the SET_INTERFACE command for the EA interface, the accessory device will continue operating in the first communication protocol mode (e.g., the IAP mode).

However, if the protocol analysis system determines (540) that the third command is associated with the first communication protocol (e.g., the third command is a Request App Launch command associated with the IAP), the protocol analysis system initiates (560) a third timer.

The protocol analysis system then determines (570) whether a fourth command associated with the first communication protocol is received from the host device prior to expiration of the third timer. If so, the accessory device will continue operating (580) in the first communication protocol mode (e.g., the IAP mode). For example, if the fourth command is a SET_INTERFACE command for the EA interface, and this command is received before expiration of the third timer, the accessory device will continue to operate using the first communication protocol. However, if the third timer expires, the protocol analysis system will issue a reset (590) such as previously described. As a result, the accessory device will operate in the second communication protocol mode.

Based on the above, examples of the present disclosure describe a method, comprising: initiating an enumeration process in response to detecting a power on event; determining a type of command received from the host device; based, at least in part, on determining the command received from the host device is a first type of command: determining the first communication protocol is unsupported by the host device; and advertising a second communication protocol to the host device; and based, at least in part, on determining the command received from the host device is a second type of command: initiating a timer; determining whether a third type of command is received before expiration of the timer; and based, at least in part, on expiration of the timer: determining the first communication protocol is unsupported by the host device; and advertising the second communication protocol to the host device. In an example, the timer is a first timer and wherein the method further comprises: determining the third type of command is received before expiration of the first timer; canceling the first timer; and initiating a second timer, the second timer having a value that is less than a value of the first timer. In an example, the method also includes determining the first communication protocol is unsupported by the host device upon expiration of the second timer; and advertising the second communication protocol to the host device. In an example, the method also includes receiving a communication from the host device over the first communication protocol prior to expiration of the second timer; and determining the first communication protocol is supported by the host device. In an example, the method also includes determining whether a command associated with the second communication protocol is received before a command associated with the first communication protocol; and based, at least in part, on determining the command associated with the first communication protocol is received before the command associated with second communication protocol, initiating a third timer. In an example, the third timer has a value that is less than the second timer. In an example, the method also includes determining whether the third timer has expired; and issuing a reset to the host device based, at least in part, on the third timer expiring. In an example, the reset causes an advertisement of the second communication protocol to the host device. In an example, advertising the second communication protocol to the host device comprises: storing information indicating the first communication protocol is unsupported by the host device; and issuing a reset to the host device. In an example, the reset causes an advertisement of the second communication protocol to the host device. In an example, the first communication protocol is an iPod Accessory Protocol (IAP). In an example, the second communication protocol is associated with a Universal Serial Bus (USB) protocol.

Examples also describe an accessory device, comprising: a controller; and a protocol analysis system associated with the controller and operable to determine whether a host device to which the accessory device is connected supports an iPod Accessory Protocol (IAP) by: receiving a command from the host device; determining whether the command received from the host device is a first type of command or a second type of command; based, at least in part, on determining the command received from the host device is the first type of command: determining the IAP is unsupported by the host device; and advertising a Universal Serial Bus (USB) protocol to the host device; and based, at least in part, on determining the command received from the host device is the second type of command: initiating a timer; determining whether a third type of command is received before expiration of the timer; and based, at least in part, on expiration of the timer: determining the IAP is unsupported by the host device; and advertising the USB protocol to the host device. In an example, the timer is a first timer and wherein the protocol analysis system is further operable to: determine the third type of command is received before expiration of the first timer; and initiate a second timer, the second timer having a value that is less than a value of the first timer. In an example, the protocol analysis system is further operable to: determine the IAP is unsupported by the host device upon expiration of the second timer; and advertise the USB communication protocol to the host device. In an example, the protocol analysis system is further operable to: receive a communication from the host device over the first communication protocol prior to expiration of the second timer; and determine the first communication protocol is supported by the host device. In an example, the protocol analysis system is further operable to: determine whether a command associated with the USB protocol is received before a command associated with the IAP; and based, at least in part, on determining the command associated with the IAP is received before the command associated with USB protocol, initiating a third timer. In an example, the protocol analysis system is further operable to: determine whether the third timer has expired; and issue a reset to the host device based, at least in part, on the third timer expiring. In an example, the reset causes an advertisement of the USB protocol to the host device.

Other examples describe an accessory device, comprising: means for advertising an iPod Accessory Protocol (IAP) protocol to a host device to which the accessory device is connected; means for receiving a command from the host device; means for determining whether the command received from the host device is a first type of command or a second type of command; based, at least in part, on the means for determining whether the command received from the host device is the first type of command or the second type of command determines that the command received from the host device is the first type of command: means for determining the IAP is unsupported by the host device determines that the IAP is unsupported by the host device; and means for advertising a Universal Serial Bus (USB) protocol to the host device advertises the USB protocol to the host device; and based, at least in part, on the means for determining whether the command received from the host device is the first type of command or the second type of command determines that the command received from the host device is the second type of command: means for initiating a timer initiates the timer; means for determining whether a third type of command is received before expiration of the timer determines whether the third type of command is received before expiration of the timer; and based, at least in part, on the means for determining whether the third type of command is received expiration of the timer determines the timer has expired: the means for determining the IAP is unsupported by the host device determines that the IAP is unsupported by the host device; and the means for advertising the USB protocol to the host device advertises the USB protocol to the host device.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:

initiating an enumeration process in response to detecting a power on event;

determining a type of command received from a host device;

based, at least in part, on determining the command received from the host device is a first type of command:

determining a first communication protocol is unsupported by the host device; and advertising a second communication protocol to the host device; and based, at least in part, on determining the command received from the host device is a second type of command:

initiating a timer;

determining whether a third type of command is received before expiration of the timer; and based, at least in part, on expiration of the timer:

determining the first communication protocol is unsupported by the host device; and advertising the second communication protocol to the host device.

2. The method of claim 1, wherein the timer is a first timer and wherein the method further comprises:

determining the third type of command is received before expiration of the first timer;

canceling the first timer; and initiating a second timer, the second timer having a value that is less than a value of the first timer.

3. The method of claim 2, further comprising:

determining the first communication protocol is unsupported by the host device upon expiration of the second timer; and advertising the second communication protocol to the host device.

4. The method of claim 2, further comprising:

receiving a communication from the host device over the first communication protocol prior to expiration of the second timer; and determining the first communication protocol is supported by the host device.

5. The method of claim 4, further comprising:

determining whether a command associated with the second communication protocol is received before a command associated with the first communication protocol; and based, at least in part, on determining the command associated with the first communication protocol is received before the command associated with the second communication protocol, initiating a third timer.

6. The method of claim 5, wherein the third timer has a value that is less than the second timer.

7. The method of claim 5, further comprising:

determining whether the third timer has expired; and issuing a reset to the host device based, at least in part, on the third timer expiring.

8. The method of claim 7, wherein the reset causes an advertisement of the second communication protocol to the host device.

9. The method of claim 1, wherein advertising the second communication protocol to the host device comprises:

storing information indicating the first communication protocol is unsupported by the host device; and issuing a reset to the host device.

10. The method of claim 9, wherein the reset causes an advertisement of the second communication protocol to the host device.

11. The method of claim 1, wherein the first communication protocol is an iPod Accessory Protocol (IAP).

12. The method of claim 1, wherein the second communication protocol is associated with a Universal Serial Bus (USB) protocol.

13. An accessory device, comprising:

a controller; and a protocol analysis system associated with the controller and operable to determine whether a host device to which the accessory device is connected supports an iPod Accessory Protocol (IAP) by:

receiving a command from the host device;

determining whether the command received from the host device is a first type of command or a second type of command;

based, at least in part, on determining the command received from the host device is the first type of command:

determining the IAP is unsupported by the host device; and advertising a Universal Serial Bus (USB) protocol to the host device; and based, at least in part, on determining the command received from the host device is the second type of command:

initiating a timer;

determining whether a third type of command is received before expiration of the timer; and based, at least in part, on expiration of the timer:

determining the IAP is unsupported by the host device; and advertising the USB protocol to the host device.

14. The accessory device of claim 13, wherein the timer is a first timer and wherein the protocol analysis system is further operable to:

determine the third type of command is received before expiration of the first timer; and initiate a second timer, the second timer having a value that is less than a value of the first timer.

15. The accessory device of claim 14, wherein the protocol analysis system is further operable to:

determine the IAP is unsupported by the host device upon expiration of the second timer; and advertise the USB communication protocol to the host device.

16. The accessory device of claim 14, wherein the protocol analysis system is further operable to:

receive a communication from the host device over the first communication protocol prior to expiration of the second timer; and determine the first communication protocol is supported by the host device.

17. The accessory device of claim 16, wherein the protocol analysis system is further operable to:

determine whether a command associated with the USB protocol is received before a command associated with the IAP; and based, at least in part, on determining the command associated with the IAP is received before the command associated with USB protocol, initiating a third timer.

18. The accessory device of claim 17, wherein the protocol analysis system is further operable to:

determine whether the third timer has expired; and issue a reset to the host device based, at least in part, on the third timer expiring.

19. The accessory device of claim 18, wherein the reset causes an advertisement of the USB protocol to the host device.

20. An accessory device, comprising:

means for advertising an iPod Accessory Protocol (IAP) to a host device to which the accessory device is connected;

means for receiving a command from the host device;

means for determining whether the command received from the host device is a first type of command or a second type of command;

based, at least in part, on the means for determining whether the command received from the host device is the first type of command or the second type of command determines that the command received from the host device is the first type of command:

means for determining the IAP is unsupported by the host device determines that the IAP is unsupported by the host device; and means for advertising a Universal Serial Bus (USB) protocol to the host device advertises the USB protocol to the host device; and based, at least in part, on the means for determining whether the command received from the host device is the first type of command or the second type of command determines that the command received from the host device is the second type of command:

means for initiating a timer initiates the timer;

means for determining whether a third type of command is received before expiration of the timer determines whether the third type of command is received before expiration of the timer; and based, at least in part, on the means for determining whether the third type of command is received expiration of the timer determines the timer has expired:

the means for determining the IAP is unsupported by the host device determines that the IAP is unsupported by the host device; and the means for advertising the USB protocol to the host device advertises the USB protocol to the host device.

\* \* \* \* \*